Aug. 7, 1956 G. MEYER-JAGENBERG ET AL 2,757,498
MECHANICAL EQUIPMENT FOR MANUFACTURING, FILLING
AND SEALING CONTAINERS
Filed April 15, 1955 8 Sheets-Sheet 6
Fig.7.
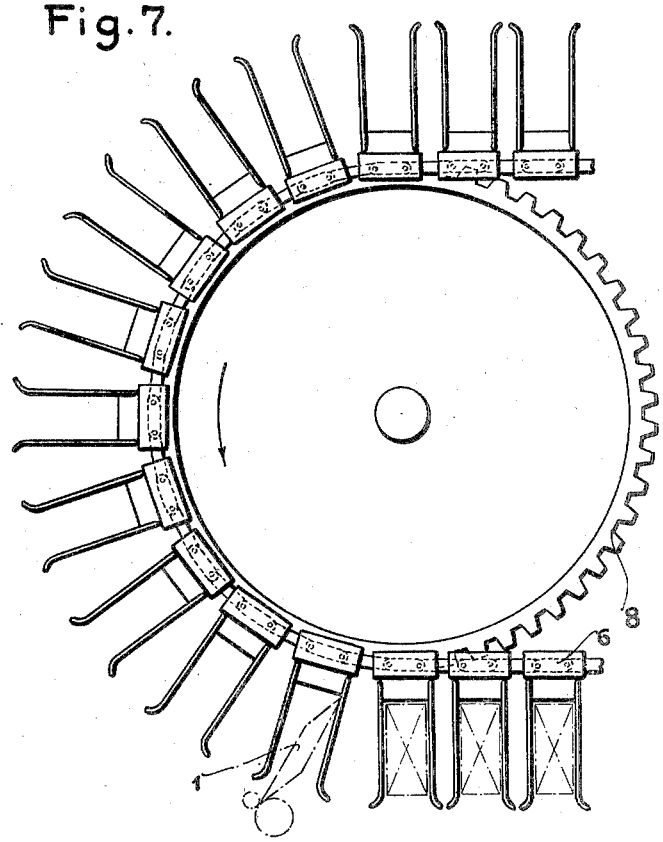
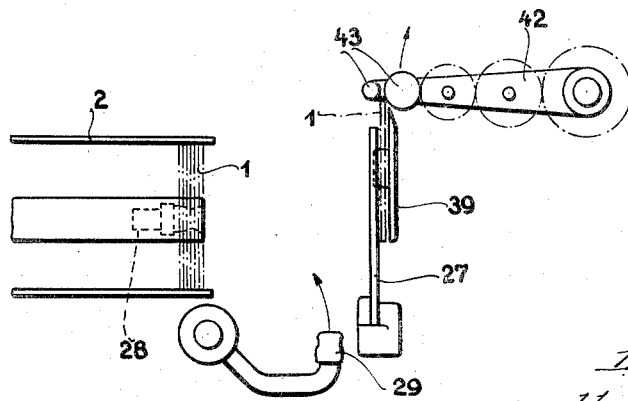
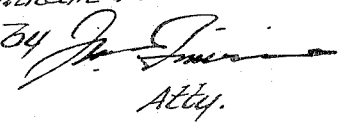
Inventor
Gunther Meyer-Jagenberg
Wilhelm Drese
by
Atty.

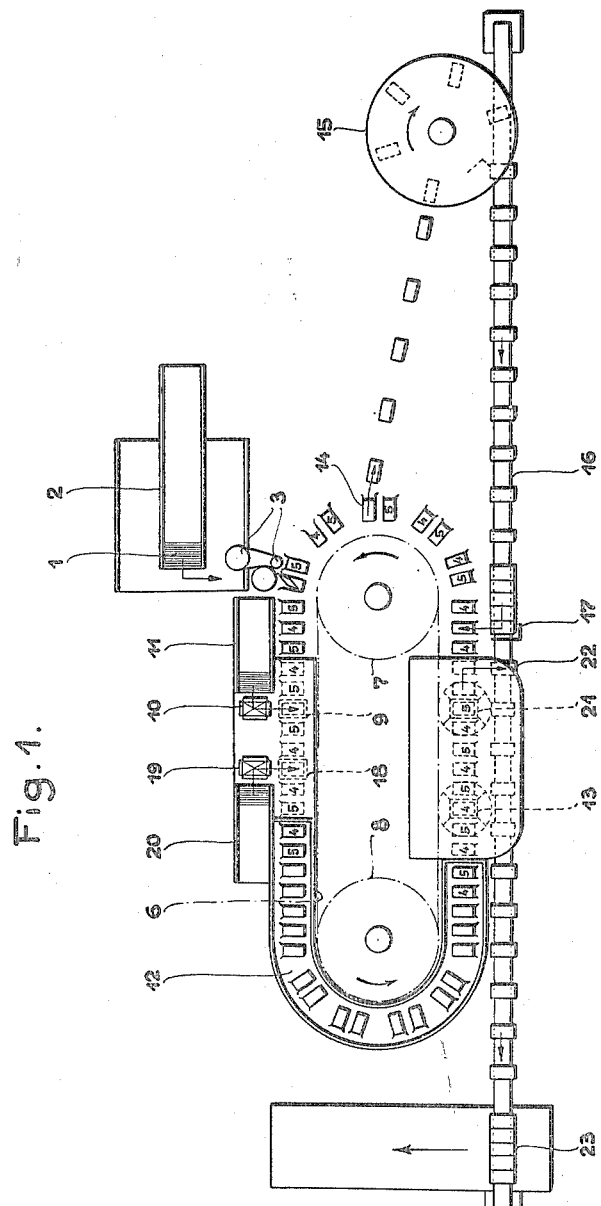

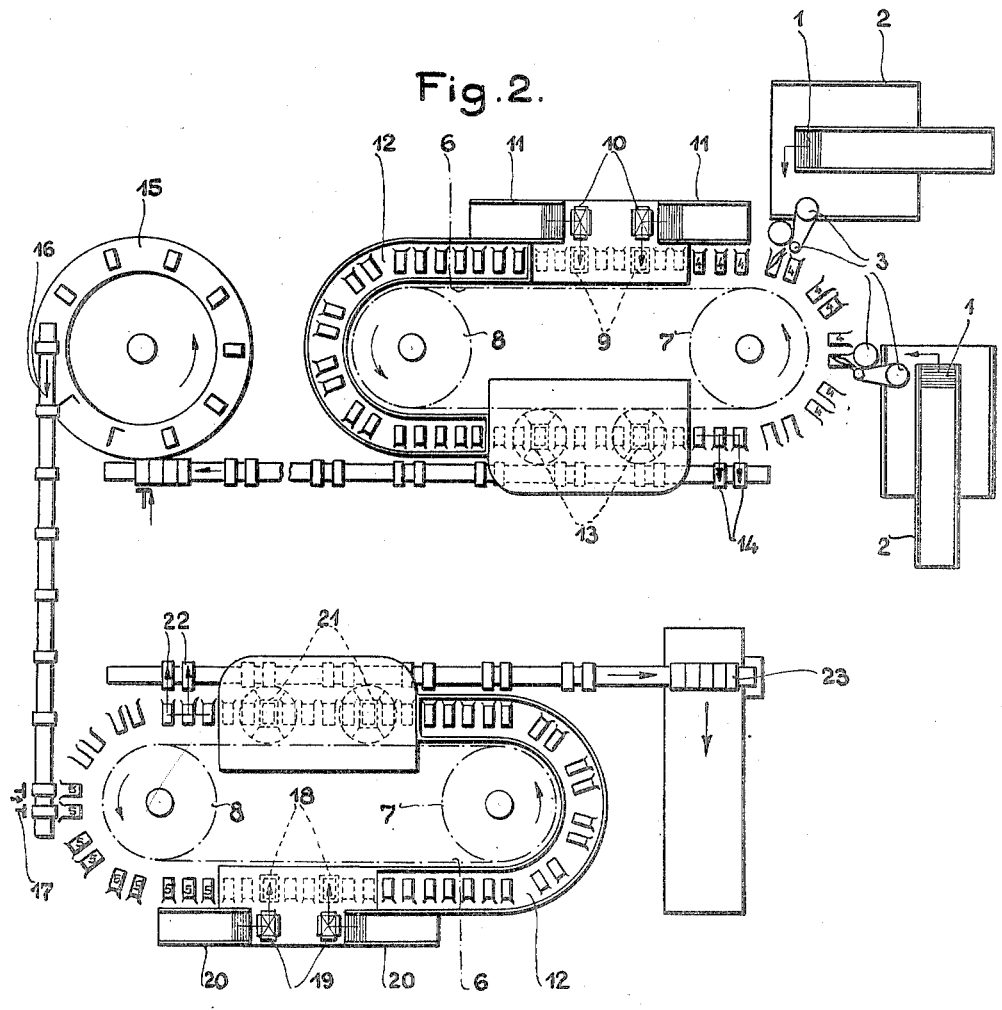

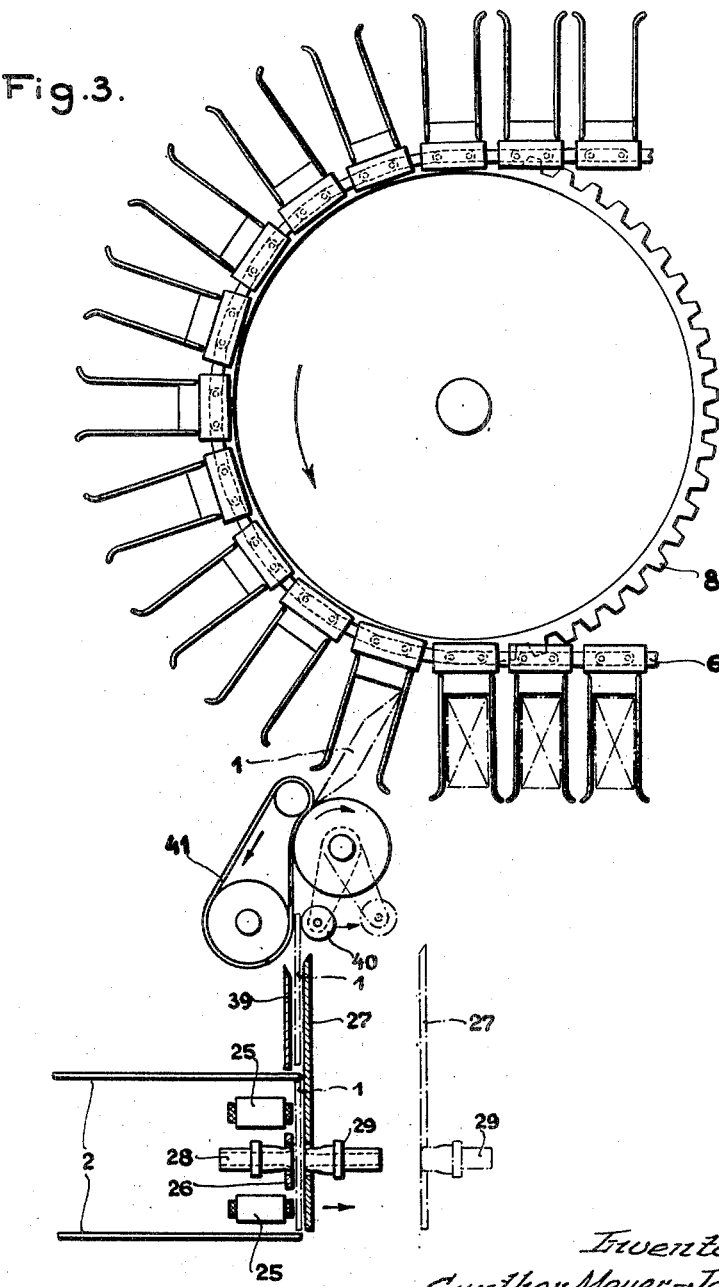

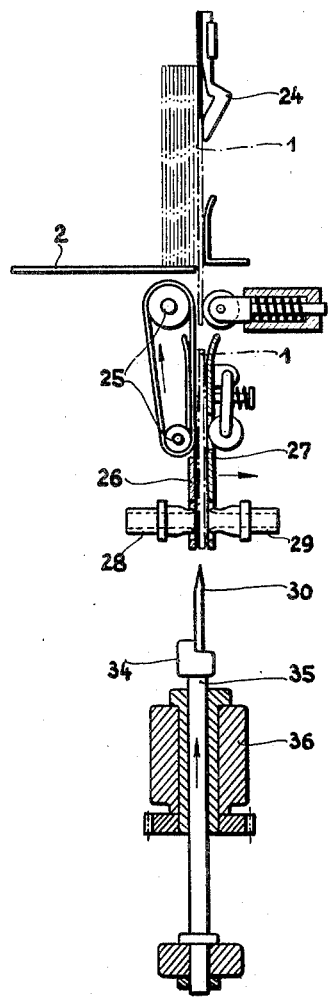
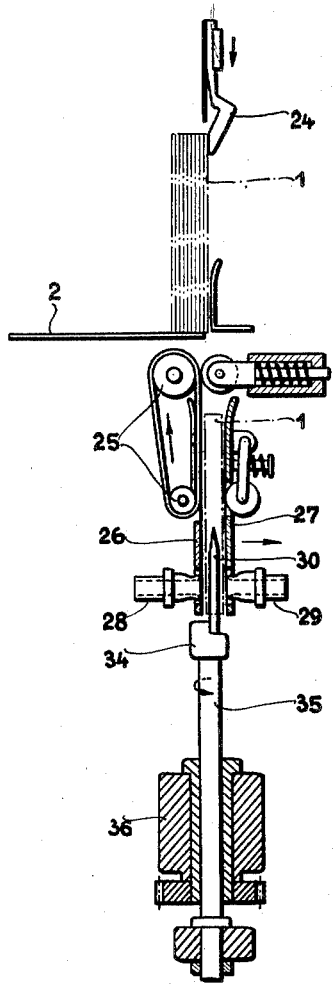

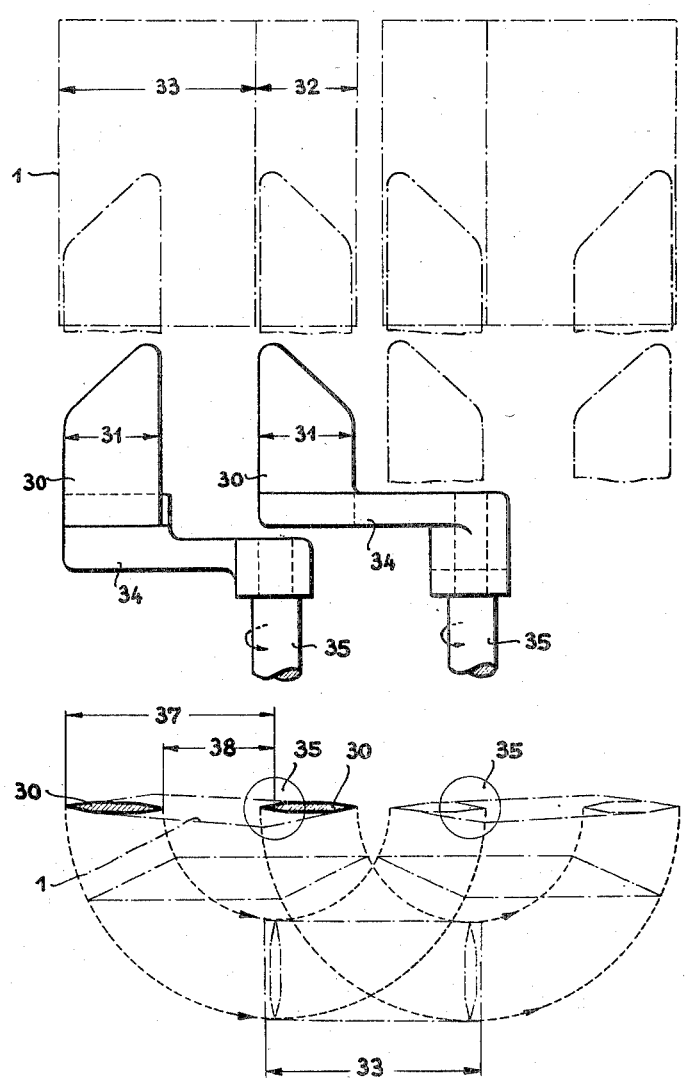

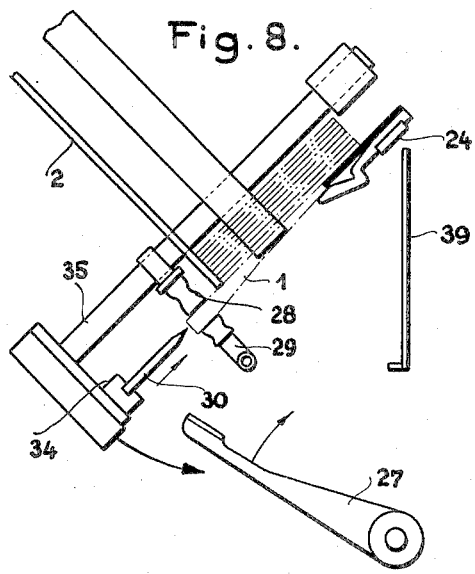
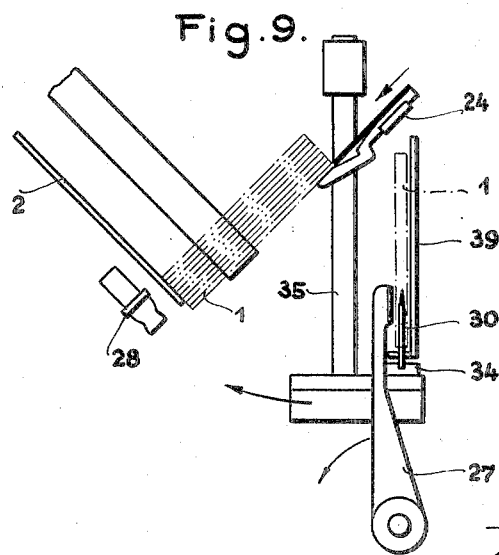

Fig. 10.
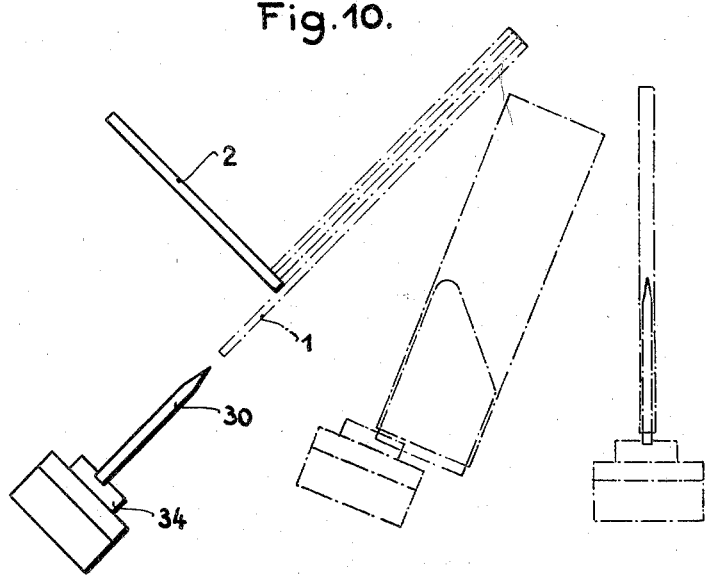
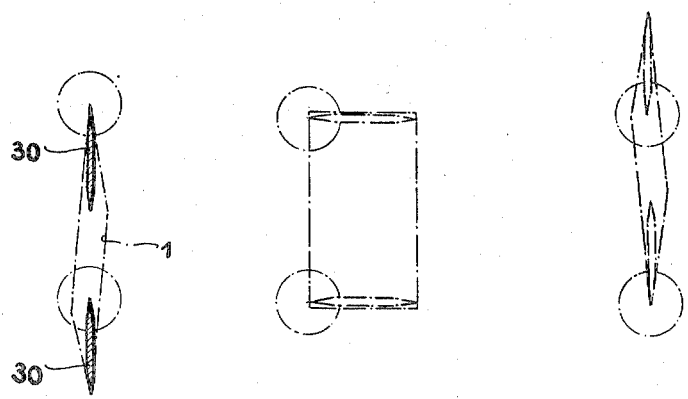

United States Patent Office 2,757,498
Patented Aug. 7, 1956

2,757,498

MECHANICAL EQUIPMENT FOR MANUFACTURING, FILLING AND SEALING CONTAINERS

Gunther Meyer-Jagenberg and Wilhelm Drese, Dusseldorf, Germany

Application April 15, 1955, Serial No. 501,591

Claims priority, application Belgium, December 10, 1949

7 Claims. (Cl. 53—186)

This invention relates to apparatus for automatically manufacturing, filling, and sealing containers or boxes made of cardboard, paper or the like, with an intermittently working, endless conveyor system into which the container body is inserted and provided, first, with the closure to form the bottom of the container to which it is to be compressed, whereupon the container will be tilted and filled, outside of the conveyor system, and then be supplied with the closure forming the lid or top of the container.

There is known mechanical equipment for manufacturing, filling and sealing containers which consist of a body made of paper, cardboard or the like, and of an upper and a lower closing part. Such equipment is substantially composed of two separate, circulating conveyor systems, in the first of which the container is made by inserting the bottom into the container body and by compressing it with the latter, whereas the container will be tilted and filled by hand or mechanically on its way to the second conveyor system in order to be provided with the cover in this conveyor installation.

Another known mechanical equipment of this type consists only of one circulating conveyor system, in which the members of the conveyor, provided to receive the containers to be manufactured, are designed as mandrils from which the containers will be removed, after their first circulation and after having been tilted and filled outside of the conveyor system, in order to be fed afresh, for a second circulation, to the frame-shaped members of the same conveyor, for the purpose of sealing the filled containers.

In contradistinction to the known equipment, the apparatus according to this invention is characterized by the fact that all the members of the conveyor system, designed for receiving the containers, the ones to be manufactured as well as the ones to be filled and to be sealed, are formed as uniform transportation frames which carry the containers through the appliances performing the manufacturing and sealing operations. Loading the conveyor system is done here in such a manner that, during the first circulation, each second conveying frame is fed with a container body and a bottom closing part for manufacturing the container, whereas during the second circulation, each intermediate frame receives a filled container to be sealed, so that the conveyor frames are alternately charged with a container to be made and a container to be sealed.

A special advantage of this arrangement results from the possibility of using these machines as a high-speed plant in which, with a view to double the output, two machines of this type are applied so that all the frames of the first machine are charged with containers to be manufactured, which pass, on their way to the second machine, through a tilting and filling unit in order to be transmitted then to the conveyor system of the second machine, in which all the frames are loaded with filled containers for the purpose of their being sealed. With this arrangement, the conveyor system of the first machine will be charged each time with two containers to be manufactured, which are removed in pairs, after one circulation, from the conveyor in order to be supplied again in pairs, after their having been tilted and filled, to the conveyor system of the second machine in which, anew in one circulation, the sealing of the containers is performed. Herewith the same members which, in the case of one application of the machine, manufacture and seal the containers in two circulations, solely manufacture or solely seal the containers, in one circulation each, in the case of employing the machine twice.

A further advantage of the present invention lies in the fact that into the tubular carton pushed out from a stack, and pre-opened by two vacuum cups attacking from both sides, a pair of blades are introduced, by the pivoting movement of which the carton is not only carried away from the plane of the stack, but also set up and, if occasion arises, folded down to the opposite flattened condition, with a view to permit of the longitudinal edge of the bent over and reflattened carton being gripped by transportation rollers or belts, in order to be fed to the transport frames of a conveyor system for its subsequent processing.

This arrangement warrants a secure opening and turning over of the cartons since the members for opening and bending over seize the workpiece from within so that its giving way is impossible. In addition to that, the short paths of the work and the small strokes of the members form the base for a high speed operation of the device.

The invention is described in the following specification and clearly illustrated in the accompanying schematic drawings:

Figure 1 is a diagrammatic top plan view of the simple mechanical equipment according to the invention;

Figure 2 is a diagrammatic top plan view of a double mechanical equipment according to the invention;

Figure 3 is a top plan view of the spacing-device with the hopper, transportation rollers and part of the conveyor system;

Figure 4 is a side view in elevation, partially in section, of the stacker with the pusher or feeding pin, drawing appliance and pair of blades;

Figure 5 is a view similar to Fig. 4 with a pre-opened carton and the pair of blades introduced into it;

Figure 6 is a diagrammatic view illustrating the movement of the pair of blades in setting up and reflattening the carton in a front view and a top plan view;

Figure 7 is a fragmentary top plan view of another example of the spacing-device with stacker, transportation rollers and conveyor system;

Figure 8 is a side view in elevation of the stacker with feeding pin and pair of blades;

Figure 9 is a view similar to Fig. 8 with the pair of blades moved aside, and

Figure 10 is a diagrammatic view illustrating the movements of the pair of blades in setting up and reflattening the carton in a front view and top plan view.

By the apparatus shown in Fig. 1, tubular container-body blanks 1, in flattened or knock-down condition, will be removed from the stacker 2 and be opened in order to be fed through the transportation rollers 3, to the conveying frames 4 of the conveyor system 6, as will be described hereinafter. The conveyor system 6 is supported by a chain circulating intermittently step by step around the sprockets 7 and 8, the advance of the chain being so calculated that merely each second frame, that is, consequently, only the frames 4, will be fed with the container body 1.

Upon subsequent movement of the conveyor 6, the frames 4, with the container bodies 1 set up, arrive at the inserting station 9, in which the closures 10, provided to form the container bottoms and previously fed from the stacker 11, are inserted into the upper edge of the container body. The closures 10, the interior sides of which are laminated with a thermoplastic coating, are provisionally inserted into the container body 1 merely in a loose manner, so that the side flaps of the closures 10 project nearly vertically upwards with respect to the plane of the closure. In the subsequent course, the frames 4 containing the box bodies 1 and the closures 10, are now guided through a heating device 12 extending over about 1/3 of the total path of circulation.

In the heating device 12, the thermoplastic coating of the closures 10 is activated by heat, that is, rendered tacky or adhesive. In connection with the heating device 12, the containers, with their open ends directed downward, are fed under the pressing station 13, in which the side flaps of the closures 10, nearly dressed vertically to the closure plane in the inserting station 9, are placed, in a U-shaped form, around the upper edge of the container body 1, in order to be compressed with the latter and form a strong and solid joint. The containers will now travel to the discharge station 14 where they are removed from the conveyor system 6 and fed to a filling device 15.

On their way to the filling device 15, the containers are tilted over, by a mechanical or pneumatic contrivance (not shown) in such a manner that the closures 10, definitely inserted and compressed, now form the bottom of the containers whose open ends are directed upwardly. In this position, the containers are carried into the filling device 15 where they are filled and from where they are conveyed to the station 17 by means of a continuously running transportation belt 16. At this station 17, the containers now are again delivered to the conveyor system 6, but this time to the still empty frames 5 lying between the frames 4, so that the frames 4 and 5 of the conveyor system 6 are now alternatively loaded with a container to be manufactured and with a filled container to be sealed.

In the second circulation, the frames 5 with the filled containers, still open at the top, are carried, by the conveyor system 6 advancing intermittently, each time by two frame divisions, to the stations 18 where the closures 19, forming the lids of the containers, are fed from the stacker 20 for the purpose of inserting them into the open tops of the containers by an operation according to that of the inserting station 9.

The containers, provided with the upper closures 19, pass through the heating device 12, in which the thermoplastic coating of the closures 19 is heated and rendered adhesive. With the subsequent movement of the frames 5 into the compressing station 21, the closures 19 are compressed with the container bodies, whereupon the filled containers are finally sealed. The containers thus manufactured, filled and sealed, are now ejected from the frames 5 at the station 22, onto the transportation belt 16 which conveys the finished containers to the delivery device 23.

The mechanical equipment represented in Fig. 2 is illustrative of the possibility of employment of the machine shown in Fig. 1 in a high-production plant, in which two machines of the type described above are used in such a way that the first machine serves solely for manufacturing, and the second machine, solely for sealing the filled containers. Adjoining the first machine are two stackers 2, from which the container-body blanks 1 are fed to the frames 4 of the conveyor system 6 by means of the transportation rollers 3 so that all the frames are loaded with opened container bodies. At the inserting stations 9, the container bodies 1 are provided with closures 10 fed from the stackers 11.

The interior sides of the closures 10, forming the bottoms of the containers, are coated with a thermoplastic material which will be heated and activated in the adjoining heating device 12. After leaving this device, the containers are guided under the compressing stations 13, in which the closures 10 are compressed with the container bodies and then conveyed in pairs from the conveyor system 6, by a pusher in the station 14, onto a transferring conveyor, to the filling device 15, whereby the containers are tilted, on the way to the filling machine, in such a manner that their open ends are directed upwardly.

After having been filled in the filling device 15, the containers are brought, by the transportation belt 16, to the second machine where they are introduced in pairs into the frames 5 of the conveyor system 6, so that all the frames of the conveyor system 6 of the second machine are charged with filled containers to be sealed. During the circulation of the conveyor system 6, the filled containers are provided, at the station 18, with the closures 19 forming the lids of the containers. These closures will be compressed, after their passage through the heating device 12, with the container bodies 1 at the compressing station 21, so that the completely filled and sealed containers may be ejected from the conveyor system 6 at the station 22 and be carried, over a delivery conveyor, to the collecting device 23.

In the example of the spacing-device shown in Figures 3 to 6, the tubular carton 1, still in flattened condition in the stacker 2, will be moved by the feeding device 24 far enough to permit its lower edge being gripped by a drawing arrangement 25 which removes it from the stacker 2. The carton 1 is thereby brought between the stationary guide plate 26 and the back-stop plate 27 travelling vertically with respect to the stack plane. At the lower edges of the guide plate 26 and of the back-stop plate 27, there is provided a pair of vacuum cups 28, 29, the vacuum cup 29 and the back 26 being movable relative to the plate 27 and cup 28 so that when they move away, the carton 1, lying between the guide plate and the back stop, will be pre-opened.

A pair of blades 30, having an up-and-down motion as well as a pivoting motion, are introduced into the tubular carton 1 pre-opened in this manner. These two blades 30, the width 31 of which corresponds to the side width 32 of the carton 1, Fig. 6, are carried by two cranks 34 whose centers of rotation are secured to two pivoting axles 35 which are parallel to the longitudinal direction of the blades 30. These pivoting axles are mounted in a guide bushing 36 for up-and-down as well as pivotal movement. The distance of the rotation centers of the two pivoting axles 35 from each other corresponds approximately to the side width 33 of the carton 1 to be opened or squared.

With the beginning of the swinging motion of the pivoting axles 35, the blades 30, introduced already into the preopened carton 1 by means of the upward movement of the pivoting axles, are removed from the guide plate 26 lying in the stack plane, wherewith the back plate 27 follows this movement simultaneously in order to clear the way for the carton just being opened.

Owing to the pivoting motion of the pair of blades 30, the carton is not only moved away from the guide plate 26, but also folded over, in the course of the swinging motion of the pivoting axles 35, performed by about 180°, from the initially flattened through the fully opened to the opposite reflattened condition. At the end of the swinging motion, the reversed carton 1 lies in a plane situated laterally of the position of the carton ejected from the stack, and thereby avoids interference with a newly ejected carton. This presupposition, necessary for a trouble-free operation, will be obtained by the fact that the sum of the radii 37+38, that is to say, the sum of the distances from the center of rotation of the pivoting axle 35 to the outer longitudinal edge of the blade 30, and from the center of rotation of the pivoting axle to the inner longitudinal edge of the blade 30, is greater than the widths 32+33 of the flattened carton 1.

With the end of the reversing operation, the back stop plate 27 travels again towards the plane of the carton 1 in placing the carton, the pair of blades 30 being drawn downwardly from this carton, towards the stationary stop plate 39, keeping it in its reversed knock-down condition. In this position, the carton 1 projects, with its longitudinal edge directed towards the conveyor system 6, beyond the front edge of the stop plate 39 and of the back stop 27, when the swinging roller 40, keeping time with the back stop 27 travelling to and fro, presses the latter to the feeding belt which supplies the carton to the conveying frames of the conveyor system 6. Owing to its trend to reassume its original knock-down condition, the carton stands up here in order to take up a position according to the form of the transportation frame, that which permits of its being handled subsequently.

In the form of embodiment shown in Figures 7 to 10, the stacker 2, containing the tubular cartons 1, is slantwise arranged. The feeding device 24, travelling in the direction of the stacker obliquity, shoves the foremost carton 1 only far enough as to permit the projecting lower edge of the tubular carton being pre-opened by the two vacuum cups 28 and 29 which attack it from opposite sides, whereby the introduction of the pair of blades 30, moving up and down in the plane of the carton, is rendered feasible. The blades 30 are secured to pivoted blade carriers 34 which, on their part, are arranged at the lower ends of the swinging arm 35.

These swinging arms 35 now swing, the movable vacuum cup having left their swinging range, from the slant position shown in Fig. 8, into the vertical position shown in Fig. 9. On this path, the slewing motion of the blades 30 is regulated, the blades keeping time with the to-and-fro motion of the swinging arm 35 in such a manner that the blades 30 are turned each time by about 180° around their longitudinal axles, whereby the carton 1 is turned from its flattened condition, through the fully opened condition, into the opposite collapsed position.

The knock-down carton 1 will now be placed against the stop plate 39 and held in its flattened condition by the swingable back stop 27, the pair of blades 30 having been withdrawn downwards from the carton 1. The longitudinal edge of the flattened carton 1, projecting beyond the front edge of the stop plate 39 and of the back stop 27, will be seized by a pair of rollers 43, rotatingly secured in the slewable lever 41, which rollers transmit the carton to the frames of the conveyor system with a view of its further processing.

What we claim is:

1. Apparatus for forming, filling and sealing cartons, comprising an endless conveyor including successive uniform carton receiving frames, means adjacent said conveyor for depositing a carton tube in a conveyor frame, drive means for said conveyor and operative to move said conveyor step-by-step and position alternate frames in carton tube receiving position, means adjacent said conveyor for supplying and attaching a bottom to the carton tubes in alternate frames, carton filling means including transport means for removing the formed cartons from said frames and passing them to said filling means and thereafter returning the filled cartons and inserting them successively into alternate frames between said frames occupied by the unfilled carton tubes, means adjacent said conveyor for inserting, securing and sealing a top to the filled cartons, and means for discharging the sealed cartons from said conveyor.

2. Apparatus as defined in claim 1 wherein said carton tube depositing means comprises a guide for receiving a stack of tubes that are folded flat, means for discharging one flat tube at a time, means for opening the discharged tube and refolding said tube in the opposite sense, and means for feeding the oppositely folded tube to the conveyor frame, whereby said tube tends to unfold and remain open in said frame, said tube opening and refolding means comprising a support adjacent said guide and disposed opposite an end of a discharging tube, a pair of blades pivotally mounted on said support in substantially parallel relation and on substantially parallel axes, said blades extending from said support toward the discharging tube and being disposed substantially in the plane of the tube for insertion into said tube, means for pivotally moving said blades simultaneously and maintaining the substantially parallel relation to open said tube and refold it in opposite relation, and means for gripping said oppositely folded tube and supplying it to said feeding means, said gripping means and said support being relatively movable in the plane of the tube to remove the tube from said blades.

3. Apparatus as defined in claim 2 wherein said tube opening means comprises a pair of oppositely disposed suction cups to grip the opposite walls of the tube at the end adjacent said blades, at least one of said cups being movable relative to the others to partially open the end of said tube to receive said blades.

4. Apparatus as defined in claim 3 wherein said blade axes are spaced a distance substantially equal to the width of an opened carton tube.

5. Apparatus as defined in claim 4 wherein said blades comprise cranks and are offset from their axes, the sum of the radii from each said axis to the inner edge and to the outer edge of the respective blade being greater than the width of a folded carton.

6. Apparatus as defined in claim 5 wherein said oppositely folded tube gripping means comprises a fixed plate against which the tube is positioned by said blades, and a cooperating plate that is movable from the fixed plate to permit pivotal movement of said blades and then movable toward said fixed plate to grip the tube therebetween.

7. Apparatus as defined in claim 6 wherein said feeding means is disposed adjacent said plates and engages an edge of the carton therebetween to withdraw it from said plates and feed it to a conveyor frame.

References Cited in the file of this patent

UNITED STATES PATENTS

| | | |
|---|---|---|
| 648,241 | Craw | Apr. 24, 1900 |
| 954,704 | Scales | Apr. 12, 1910 |
| 2,241,817 | Howard | May 13, 1941 |

FOREIGN PATENTS

| | | |
|---|---|---|
| 492,657 | Belgium | Dec. 1949 |
| 492,658 | Belgium | Dec. 1949 |
| 717,120 | Great Britain | Oct. 20, 1954 |